United States Patent [19]

Gerber

[11] Patent Number: 4,501,113

[45] Date of Patent: Feb. 26, 1985

[54] FRUIT HARVESTING MACHINE

[76] Inventor: Curtis E. Gerber, 4015 Bayshore Blvd., 8C, Tampa, Fla. 33611

[21] Appl. No.: 427,630

[22] Filed: Sep. 29, 1982

Related U.S. Application Data

[62] Division of Ser. No. 271,943, Jun. 9, 1981, Pat. No. 4,388,798.

[51] Int. Cl.³ ..................... A01D 46/00; A01D 46/10
[52] U.S. Cl. ..................................... 56/328 R; 56/31
[58] Field of Search .................. 56/332, 328 R, 30, 31

[56] References Cited

U.S. PATENT DOCUMENTS

| | | | |
|---|---|---|---|
| 477,177 | 6/1892 | Groom | 56/31 |
| 1,324,549 | 12/1919 | Hulse | 56/332 |
| 1,455,908 | 5/1923 | Daniel | 56/31 |
| 1,691,146 | 11/1928 | Boggs | 56/31 |
| 2,471,326 | 5/1949 | Hoyt, Sr. | 56/328 R |
| 2,499,037 | 2/1950 | Roles | 56/328 R |
| 2,680,338 | 6/1954 | Space | 56/30 |
| 3,233,396 | 2/1966 | Gallo | 56/328 R |
| 3,460,330 | 8/1969 | Black, Jr. | 56/328 R |
| 3,473,312 | 10/1969 | Holt | 56/332 |
| 3,507,105 | 4/1970 | Mays et al. | 56/328 R |
| 3,517,496 | 6/1970 | Kemp et al. | 56/328 R |
| 3,591,949 | 7/1971 | Connery | 56/332 |
| 3,756,001 | 9/1973 | Macidull | 56/332 |
| 4,388,798 | 6/1983 | Gerber | 56/339 |

FOREIGN PATENT DOCUMENTS 1031439 6/1966 United Kingdom ............. 56/328 R Primary Examiner—Paul J. Hirsch
Attorney, Agent, or Firm—Frijouf, Rust & Pyle

[57] ABSTRACT

A vacuum operated fruit harvesting machine is disclosed for harvesting fruit from fruit trees. The fruit harvesting machine of the invention comprises a picker head connected to an airflow control valve. A discharge valve is then connected to the airflow control valve by means of a plurality of rigid or flexible conduits. The picker head comprises a curved conduit having a lower lip portion. A gripper means is positioned relative to the upper edge of the curved conduit for gripping the stem of the fruit to be picked. As the fruit is conducted into the picker head, the fruit pivots against the upper edge of the curved conduit causing the stem to be peeled away from the fruit at the calex thereof. The airflow control valve comprises a pair of gates which open in response to a pressure differential between the atmospheric air and the air contained within the picker head. When the fruit is positioned in the picker head, the air contained within the picker head is evacuated through bleed ports to create such a pressure differential, at which time the gates fully open to allow the fruit to pass therethrough. The gates of the airflow control valve then immediately close to block the flow of air therethrough thereby preventing unwanted debris such as leaves from being drawn into the system. The discharge valve of the invention comprises a similar pair of gates which are forced open by means of a pair of gate operating levers. The discharge valve operates to reduce the velocity of the fruit as it exits from the system and to prevent flow back air from entering the system after the fruit is discharged. A transport is provided for supporting the fruit harvesting machine of the invention enabling operators to conveniently manipulate the picker head for harvesting the fruit from the trees.

5 Claims, 17 Drawing Figures

FRUIT HARVESTING MACHINE

This is a division of application Ser. No. 271,943, filed June 9, 1981 now U.S. Pat. No. 4,388,798.

BACKGROUND OF THE INVENTION

1. Field of the Invention

This invention relates to vacuum operated fruit harvesting machines. More particularly, this invention relates to picker heads, airflow control valves, and discharge valves of fruit harvesting machines and further relates to a transport for transporting the fruit harvesting machine between adjacent rows of fruit trees.

2. Description of the Prior Art

Presently there exist many types of vacuum operated fruit harvesting machines designed to harvest fruit from fruit trees. One such type of vacuum operated fruit harvesting machine comprises a picker head which is connected in fluid communication with a vacuum source by sections of rigid or flexible conduits. U.S. Pat. Nos. 2,545,072, 3,473,312, and 3,664,104 illustrate such types of fruit harvesting machines. The primary disadvantage of these types of fruit harvesting machines is the fact that a large amount of vacuum is required to pull the fruit from their stems.

Other types of fruit harvesting machines have been developed to reduce the amount of vacuum required to separate the fruit from the stem. Specifically, these types of fruit harvesting machines are illustrated in U.S. Pat. Nos. 2,711,625, 3,538,695, 3,591,949, 3,756,001, and 3,898,785, and typically comprise some type of twisting mechanism which operates to twist the fruit as the fruit is conducted into the conduits by the vacuum source. Unfortunately, the twister heads usually comprise complex mechanisms which increase the cost and the reliability of the fruit harvesting machine when operating in working conditions. Moreover, the twister heads tend to be substantially heavy thereby causing great fatigue to the operators harvesting the fruit. For these reasons, twister heads have not been widely accepted in the trade.

Therefore it is an object of this invention to provide an apparatus which overcomes the aforementioned inadequacies of the prior art devices and provides an improvement which is a significant contribution to the advancement of the fruit harvesting machine art.

Another object of this invention is to provide a fruit harvesting machine including a lightweight picker head which easily separates the fruit from the stem without the need of a great amount of vacuum supplied to the picker head.

Another object of this invention is to provide a fruit harvesting machine wherein the picker head comprises no moving parts which add to the weight and complexity thereof and which may fail under working conditions.

Another object of this invention is to provide a fruit harvesting machine including an airflow control valve for reducing the airflow through the picker head while a fruit is not actually being picked.

Another object of this invention is to provide a fruit harvesting machine wherein the airflow control valve reduces the airflow through the picker head thereby conserving energy and maintaining maximum pressure differential capacity at the picker head.

Another object of this invention is to provide a fruit harvesting machine including an airflow control valve which avoids drawing unwanted leaves, branches and debris into the picker head.

Another object of this invention is to provide a discharge valve which operatively connects the vacuum source relative to the picker head enabling the harvested fruit to be discharged into a storage area while minimizing the amount of flow back air flowing to the vacuum source as the fruit are discharged.

Another object of this invention is to provide a fruit harvesting machine including a mobile transport for transporting the various components of the fruit harvesting machine.

Another object of this invention is to provide a fruit harvesting machine wherein the mobile transport is designed to travel between adjacent rows of fruit trees enabling the operators to conveniently manipulate the conduits of the fruit harvesting machine to pick the fruit from the trees.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a fruit harvesting machine. More particularly, the fruit harvesting machine comprises a picker head connected to an airflow control valve. The airflow control valve is then connected by a plurality of a rigid and flexible conduits to a discharge valve. The discharge valve is then connected to a vacuum source. The invention further includes a novel transport which supports a plurality of discharge valves, the vacuum source, and the required engine for operating the same.

The picker head of the invention comprises a unique design which utilizes the principles of leverage to quickly and easily separate the fruit from their stems at their calexes thereof. More specifically, the picker head of the invention comprises a curved input conduit. A gripper means is positioned relative to the upper edge of the input conduit. As the picker head is moved toward a fruit to be picked, the gripper means securely grips the stem of the fruit at an appreciable distance from the upper edge of the input to the input conduit. The vacuum produced by the vacuum source draws the fruit into the input conduit at which time the fruit pivots about the upper edge (hereinafter referred to as the primary fulcrum point) of the input of the input conduit. During such pivoting against the primary fulcrum point, a great amount of leverage force is exerted at the calex of the fruit thereby causing the calex and correspondingly, the stem, to be peeled and separated from the fruit. In the event the stem slips within the gripper means or the stem itself stretches or in the event the fruit deforms against the primary fulcrum point, the fruit will begin to roll along the inside surface or lumen of the input conduit at a moving point hereinafter referred to as the secondary fulcrum point. Although the leverage force is substantially reduced as the fruit pivots against the secondary fulcrum point, the degree of separation between the stem and the fruit is greatly increased thereby assuring that the stem will still be separated from the fruit.

The airflow control valve of the invention basically comprises a pair of gates which pivot from a closed position blocking the flow of air to the vacuum source to an opened position. A diaphragm is operatively connected to the gates to open the gates when a pressure differential exists between the pressure of the air contained within the picker head and the atmospheric air pressure. Bleed ports are provided within the gates enabling the picker head to be evacuated of air by the vacuum source. In operation, when a fruit is positioned in the input of the picker head thereby blocking the flow of atmospheric air into the picker head, the air contained within the picker head is evacuated through the bleed ports to the vacuum source. The diaphragm senses the reduction of air pressure within the picker head and opens the gates. When the gates are open, the vacuum source quickly evacuates all of the air contained within the input conduit, the airflow control valve, and the conduits connecting the airflow control valve to the vacuum source. The atmospheric air pressure then forces the fruit through the picker head, the airflow control valve and through the conduits to be discharged. Once the fruit passes through the gates of the airflow control valve, atmospheric air fills the interior of the picker head. The diaphragm senses the presence of atmospheric air in the picker head and then closes the gates of the airflow control valve. It should be appreciated that the gates of the airflow control valve are open only so long as it takes for the fruit to pass through the picker head and through the gates themselves. This substantially reduces airflow through the system while a fruit is not actually being picked. The reduced airflow conserves energy and enables the vacuum source to maintain maximum pressure capability at the picker head. The reduced airflow also avoids drawing unwanted leaves, branches, and debris into the system.

The discharge valve of the invention basically comprises a pair of gates which are opened by means of a pair of gate operating levers. As a harvested fruit approaches the discharge valve, the fruit engages the gate operating levers which in turn, open the gates to allow the fruit to pass therethrough and be discharged into a storage area. Immediately after the fruit passes the gate operating levers, the gates return to their closed position. In their closed posiion, the gates prevent flow back air from entering the output of the discharge valve and flowing to the vacuum source. The discharge valve also serves to reduce the velocity of the harvested fruit as the fruit is discharged from the system.

The mobile transport of the invention comprises a unique design which facilitates transporting of the fruit harvesting machine between adjacent rows of fruit trees. The transport supports the engine which powers the transport itself and also powers the vacuum source of the fruit harvesting machine. A housing is connected to the vacuum source and a filter means is incorporated therein for filtering the evacuated air before the air flows into the vacuum source. A manifold is connected in fluid communication with the housing. The manifold is positioned parallel or transverse to the longitudinal axis of the transport. One or more discharge valves are then connected perpendicularly to the manifold such that the flexible conduits extend from the side of the transport. The harvested fruit discharged from the discharge valve is received by a pair of troughs positioned parallel to opposing sides of the manifold. The troughs guide the discharged fruit into a storage bin being pulled behind the transport. Alternatively, the troughs guide the discharged fruit into storage bins placed at intervals along the row of fruit trees.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
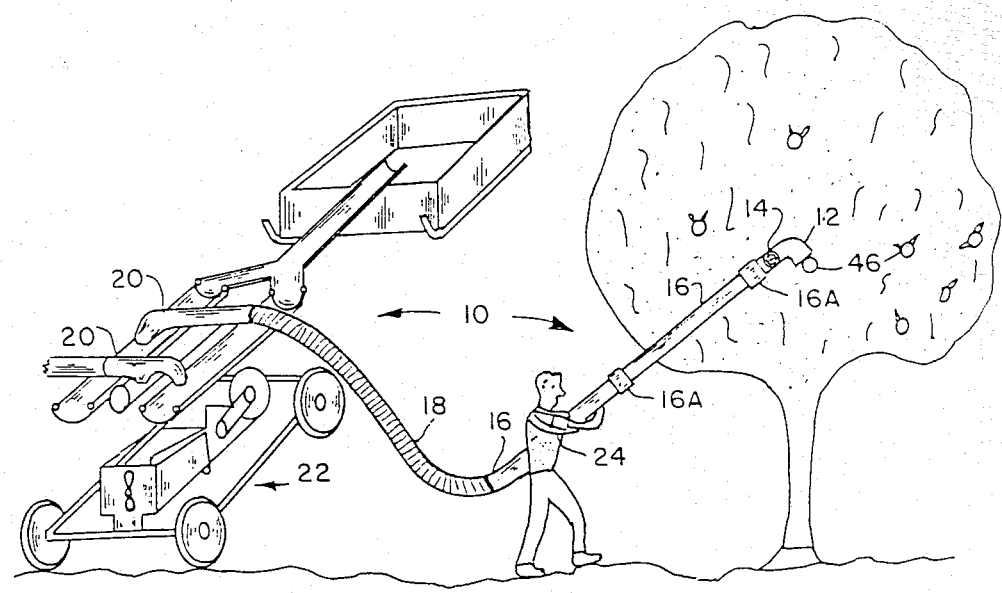
FIG. 1 is a perspective view of a fruit harvesting machine of the invention.

FIG. 1 is a perspective view of a fruit harvesting machine 10 of the invention. Basically, the fruit harvesting machine 10 comprises a picker head 12 connected to an airflow control valve 14. The airflow control valve 14 is then connected to one or more lightweight rigid conduits 16. Preferably, conduits 16 are serially interconnected by means of gasketed fittings 16A, which are common in the trade. A length of flexible conduit 18 interconnects the rigid conduits 16 to a discharge valve 20 connected to a mobile transport 22. A shoulder harness 24 may be connected to one of the conduits 16 to aid the operator 17 in supporting the weight of the conduits 16, the picker head 12, and the airflow control valve 14. The picker head 12, airflow control valve 14, discharge valve 20, and transport 22 are novel to this invention and will be described hereinafter under separate sub-headings. It should be appreciated, however, that each of the above components, or a combination thereof, may be incorporated into existing fruit harvesting machines without departing from the spirit and scope of this invention.

Picker Head

Figure 2:
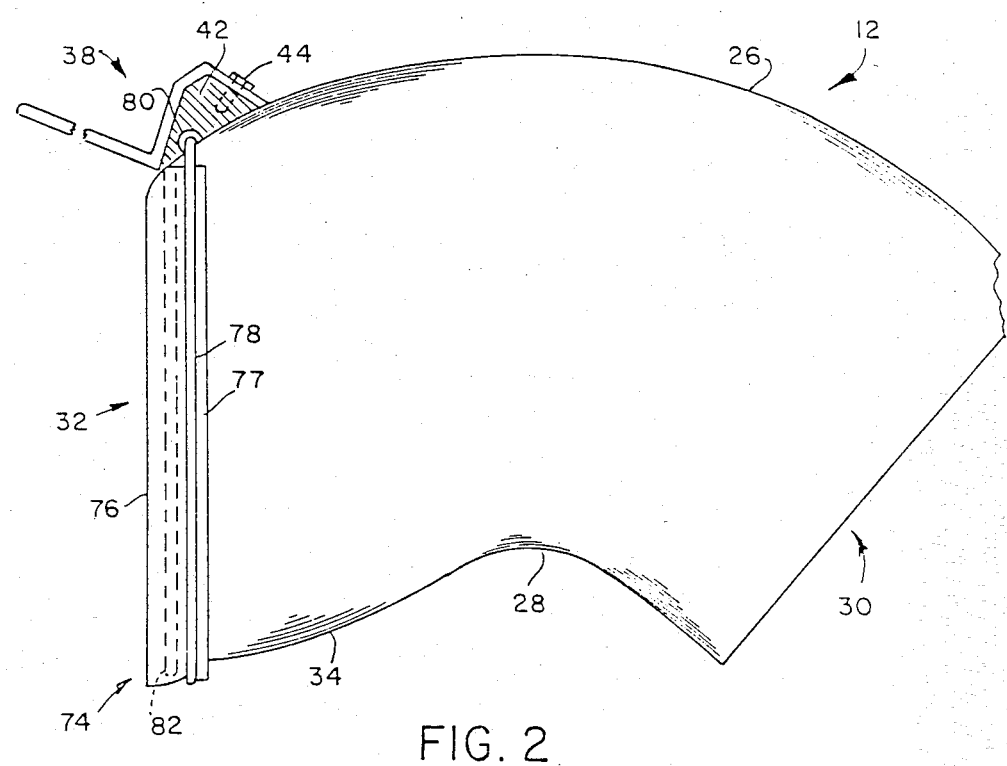
FIG. 2 is a frontal view of the picker head of the invention.
Figure 3:
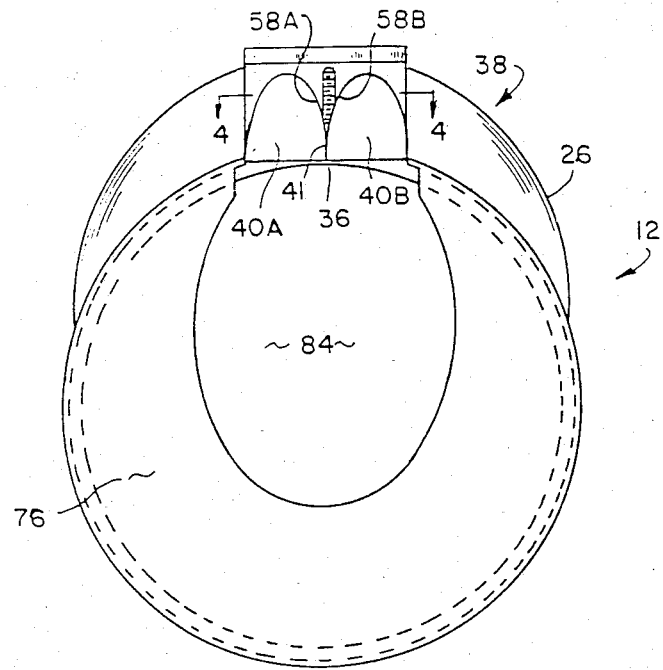
FIG. 3 is a side view of the picker head of the invention.
Figure 4:
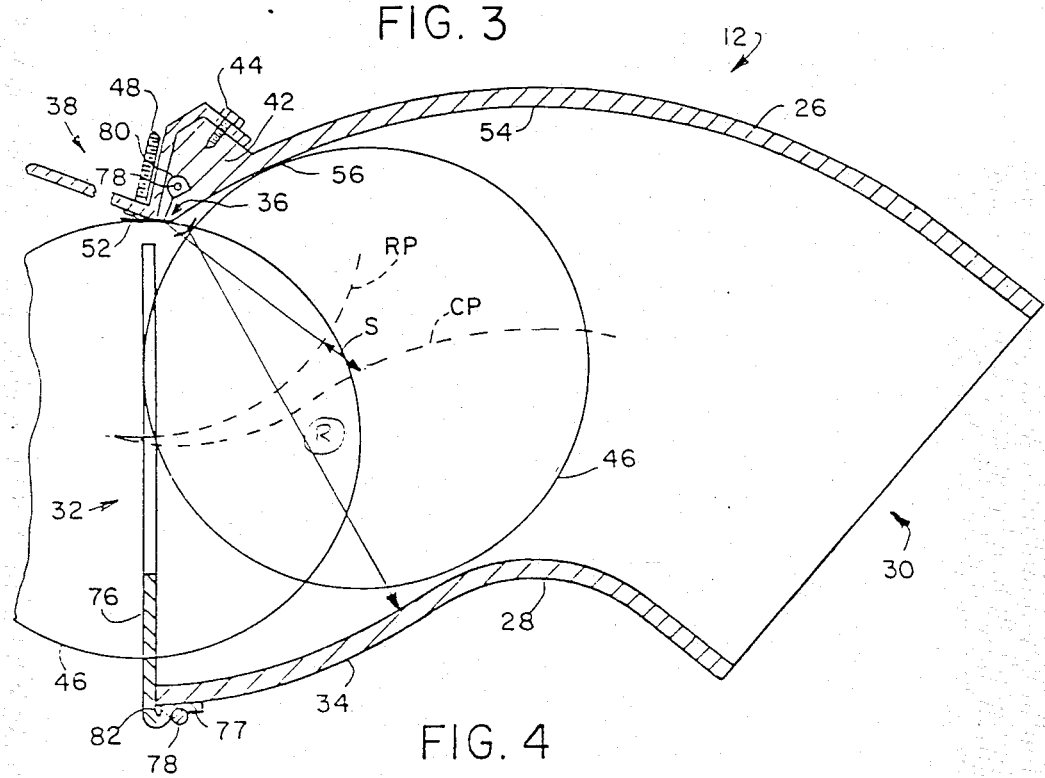
FIG. 4 is a cross-sectional view of FIG. 2 along lines 4—4 showing the interior configuration of the picker head.

As shown in FIGS. 2, 3, and 4, the picker head 12 of the invention comprises a curved input conduit 26. Preferably, the bend 28 of the input conduit 26 forms an obtuse angle between the output 30 and the input 32 of the input conduit 26. The input 32 of the input conduit 26 is further defined as having a lower concave lip portion 34, as looking from the interior of the input 32. The lower lip portion 34 is defined as having a radial curvature represented by the letter "R" with the upper edge 36 of the input 32 being the center of the radius. The lower lip portion 34 and the curvature of the input conduit 26 cooperate to prolong the distance in which the fruit 46 is radially conducted into the input conduit 26, the purpose of which is explained in detail in the following paragraphs.

A gripping means generally designated as numeral 38 is connected relative to the upper edge 36 of the input 32 of the conduit 26. The gripping means 38 comprises two rounded flanges or teeth members 40A and 40B which extend from the upper edge 36 of the input 32. A protuberance 42 is integrally molded to the outside of the upper edge 36 of the input 32. The teeth members 40 are then connected to the protuberance 42 by means of a threaded fastener 44 or the like such that the gripping means 38 will be positioned an appreciable distance from the upper edge 36 of the input 32.

The picker head 12 of the invention substantially reduces the amount of vacuum required to harvest fruit. Specifically, the picker head 12, being a completely passive device with no moving components, operates to quickly and easily separate the fruit 46 from its stem 48. More particularly, the fruit 46 is separated from its stem 48 at the calex 52 by first moving the picker head 12 toward the fruit such that the stem 48 of the fruit 46 is guided between the teeth members 40 of the gripping means 38 to enable the gripping means 38 to grip the stem 48. At this point, the reduced pressure within the input conduit 26 (produced by the vacuum source) causes atmospheric pressure to force the fruit 48 being picked into the input 32 of the input conduit 26. Having the stem securely grasped by the gripping means 38, the fruit 46 is conducted into the input 32 in a radial path during which time the fruit 46 pivots along the upper edge 36 of the input conduit 26 (hereinafter called the primary fulcrum point 36). Assuming the gripping means 38 has securely gripped the stem 48 of the fruit 46 and further assuming that the fruit 46 is non-compressable, the stem 48 will be separated from the fruit 46 at the calex 52 thereof in a peeling action as the fruit 46 is conducted radially into the input 32 of the input conduit 26. Should the stem 48 slip within the gripping means 38 or stretched, or should the fruit 46 become deformed as the fruit 46 pivots against the primary fulcrum point 36, the stem 48 may not be peeled completely from the fruit 46 during this radial motion. When this occurs, the exterior surface of the fruit 46 will roll along the inside surface or lumen 54 of the input conduit 26 at a moving fulcrum point hereinafter referred to as a secondary fulcrum point 56. When pivoting at the secondary fulcrum point 56, the fruit 46 will roll along the lumen 54 of the input conduit 26 until the calex 52 is peeled completely off of the fruit 46 thereby separating the stem 48 from the fruit 46.

It should be appreciated that the design of the picker head 12 uses the principles of leverage to easily separate the stem 48 from the fruit 46. Specifically, as the fruit 46 is conducted into the input 32 of the input conduit 26 along the radial path represented by the letters "RP" and as the fruit 46 pivots against the primary fulcrum point 36, the amount of leverage force exerted on the calex 52 of the fruit 46 to separate the stem 48 from the fruit 46 will be equal the ratio of one-half the diameter of the fruit 46 to the distance between the point at which the stem 48 is gripped by the gripping means 38 and the primary fulcrum point 36, times the force on the fruit 46 produced by atmospheric air pressure forcing the fruit 46 into the input conduit 26. As suggested earlier, this leverage force is continually exerted on the calex 52 so long as the fruit 46 is conducted along the radial path RP. For example, assuming the fruit is three inches in diameter and the distance between the point at which the stem 48 is grasped by the gripping means 38 and the primary fulcrum point 36 is one-fourth of an inch, the amount of leverage force exerted on the calex 52 of the fruit 46 will equal six times the force exerted on the fruit 46 itself. In most instances, this leverage force should be sufficient to separate the stem 48 from the fruit 46. Should the stem 48 stretch or slip within the gripping means 38, or should the fruit 46 become deformed against the primary fulcrum point 36 such that the fruit 46 rolls along the lumen 54 of the input conduit 26, the leverage force applied to the calex 52 will be substantially reduced. This is due to the fact that the fruit 46 is now moving along a controlled path represented by the letters "CP", rather than along the radial path RP. However, the adversed effects of such a reduction in the leverage force are minimized because of two factors. First, by the time the fruit 46 begins to pivot along the secondary fulcrum point 56, the fruit 46 will have traveled a substantial distance along the radial path RP and will therefore have attained a large amount of inertial kinetic force which, when added to the force of the atmospheric pressure against the fruit 46 itself, is sufficient to separate the stem 48 from the fruit 46. Secondly, the degree of separation between the stem 48 and the fruit 46, as represented by the distance "S", between the radial path RP and the controlled path CP, progressively increases as the fruit 46 is conducted further into the input conduit 26. Experiments have shown that these two factors, which are enhanced by the curvature of the input conduit 26 with respect to the gripping means 38, assure that the stem 48 will always be separated from the fruit 46.

Figure 5:
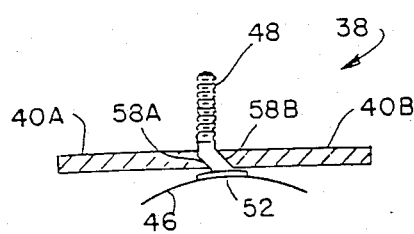
FIG. 5 is a cross-sectional view of FIG. 2 along lines 5—5 showing the first embodiment of the gripper means.

As noted earlier, the gripping means 38 functions to securely grip the stem 48 of the fruit 46 being picked as the stem 48 is engaged between the two teeth members 40. In order to increase the gripping capabilities of the gripping means 38, the inner edges 58A and 58B of the teeth members 40 are preferably cut at an angle such that the cross-sectional configuration of the inner edges 58A and 58B are disposed parallel to one another, as shown in FIG. 5. Moreover, the inner edges 58A and 58B are preferably disposed in an overlapping manner with respect to one another at the bottommost portion of the vee 41 formed at the intersection of the two teeth members 40. The angled surfaces of the inner edges 58A and 58B together with the overlapping feature assures that the stem 48 of the fruit 46 will be deformed and thus securely gripped therebetween as the stem 48 is engaged between the teeth members 40. Additionally, the overlapping inner edges 58A and 58B almost completely eliminates breakage or cutting of the stem 48 as the stem 48 is separated from the fruit 46 at the calex 52 thereof.

Figure 6:
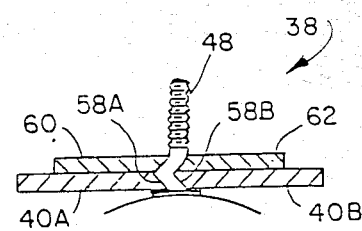
FIG. 6 is a partial cross-sectional view showing the second embodiment of the gripper means.

FIG. 6 illustrates a second embodiment of the gripping means 38 wherein the inner surfaces of the inner edges 58A and 58B of the teeth members 40A and 40B mate with one another to grip the stem 48 therebetween. Specifically, an angled member 60 is welded to the upper surface of the first tooth member 40A to form an inner edge 58A having a cross-sectional configuration which is V-shaped. Correspondingly, another angled member 62 is welded to the upper surface of the second tooth member 40B to form an inner edge 58B having a triangular cross-sectional configuration, which mates with the V-shaped cross-sectional configuration of the first tooth member 48A. The mating relationship of the V-shaped and the triangular cross-section configuration of the inner edges 58A and 58B, respectively, causes the stem 48 to be lightly squeezed and deformed, and thus gripped, when the stem 48 is forced toward the vee 41 of teeth members 40.

Figure 7:
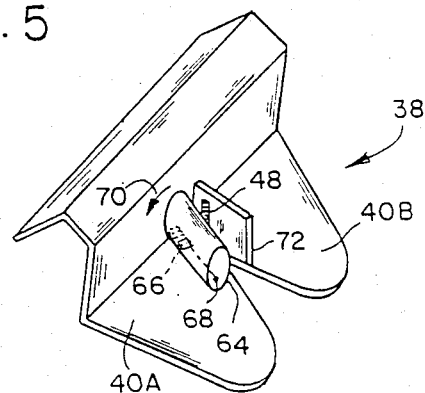
FIG. 7 is a perspective view of the third embodiment of the gripper means.

Finally, FIG. 7 illustrates the third embodiment of the gripping means 38 as comprising a cam 64 which is pivotably connected to the first tooth member 40A. Cam 64 is resiliently biased by means of spring 66 to pivot about axis 68 in the direction as shown by arrow 70. A stop 72 is connected to the second tooth member 40B. Preferably, the axis 68 of the cam 64 and the stop 72 are angled with respect with one another for receiving the stem 48 of the fruit 46. When the stem 48 is engaged between the cam 64 and the stop 72 and pulled downwardly as the fruit 46 is conducted into the input conduit 26, cam 64 will pivot toward the stop 72 thereby rigidly gripping the stem 48 of the fruit 46. After the stem 48 is separated from the fruit 46, spring 66 will force the cam 64 to pivot in the direction shown by arrow 70 thereby releasing the separated stem 48.

It is noted that the diameter of the input conduit 26 must be at least as large as the diameter of the largest fruit 46 sought to be harvested. As smaller diameter fruit 46 are picked, there will be a great amount of flow-by air which passes around the peripheral edges of the fruit 46 into the input conduit 26. As the amount of flow-by air increases, the force of the atmospheric pressure on the fruit 46 being conducted into the input conduit 26 will be effectively decreased.

In order to substantially reduce the amount of flow-by air around the periphery of the fruit, a restriction means 74 is provided by this invention. More particularly, the first embodiment of the restriction means 74 is shown in FIGS. 2, 3 and 4 and comprises a resilient diaphragm 76 which is secured about the edges of the input 32 of the input conduit 26 by means of a retaining ring 78 inserted through an aperture 80 in the protuberance 42 to encircle the edges 77 of the diaphragm 76 and input 32 of the input conduit 26. A raised lip 82 may be incorporated about the input 32 of the input conduit 26 to prevent the ring 78 from slipping off of the input 32. As shown in FIG. 3, the diaphragm 76 includes a central opening 84 which is positioned eccentric to the input 32 of the input conduit 26. The eccentically positioned central opening 84 functions to guide the fruit 46 being picked to a position close to the gripping means 38 enabling the gripping means 38 to grasp the stem 48 of the fruit 46 as close as possible to the calex 52 thereof thereby maximizing the amount of leverage force exerted on the stem 48 when the fruit 46 is radially conducted along the radial path PR into the input conduit 26. Furthermore, as the fruit 46 is radially conducted into the input conduit 26, the central opening 84 resiliently enlarges to form a seal about the fruit 46 thereby substantially eliminating any flow-by air about the peripheral edges of the fruit 46. Accordingly, without any flow-by air flowing into the input conduit 26, the input conduit 26 is rapidly evacuated by the vacuum source of the fruit harvesting machine 10 thereby increasing the amount of atmospheric pressure force on the fruit 46 which forces the fruit 46 into the input conduit 26.

Figure 8:
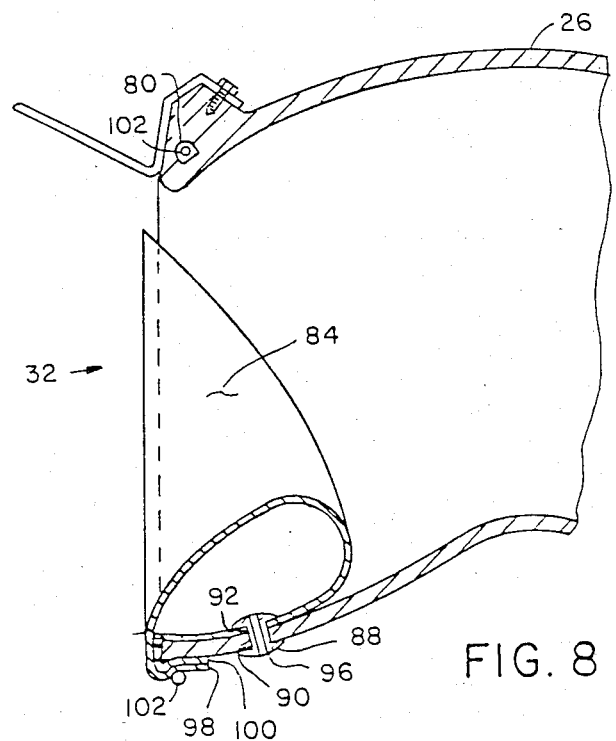
FIG. 8 is a cross-sectional view of the picker head showing the second embodiment of the restriction means as comprising an air inflatable bag secured to the interior of the picker head.

The second embodiment of the restriction means 74 is shown in FIG. 8 and comprises an inflatable bag 84 positioned annularly about the inside of the input 32 of the input conduit 26. More specifically, a plurality of inlet eyelets 88 are positioned through corresponding apertures 90 and 92 in the input conduit 26 and the side 94 of the inflatable bag 86, respectively. The inlet eyelets 88 each include a passageway 96 which enables atmospheric air to enter the inflatable bag 86. The inflatable bag 86 is further secured to the input conduit 26 by folding the edges 98 and 100 of the inflatable bag 86 over the edge of the input 32 of the input conduit 26. An annular ring 102 is then positioned through the aperture 80 in the protuberance 42 to encircle and tightly seal the edges 98 and 100 of the inflatable bag 86 to the input 32. In operation, when a fruit is positioned in front of the input 32 of the input conduit 26, the input conduit 26 will be partially evacuated. Atmospheric air then enters the inflatable bag 86 via inlet eyelets 88 to inflate the same against the peripheral edges of the fruit 46. The seal thus formed against the fruit 46 continues as the fruit 46 is radially conducted into the input conduit 26 along the radial path RP. Accordingly, flow-by air is prevented from leaking around the edges of the fruit 46 as the fruit 46 is radially conducted into the input conduit 26 thereby greatly increasing the effect of the atmospheric pressure in forcing the fruit 46 into the input conduit 26.

Airflow Control Valve

Figure 9:
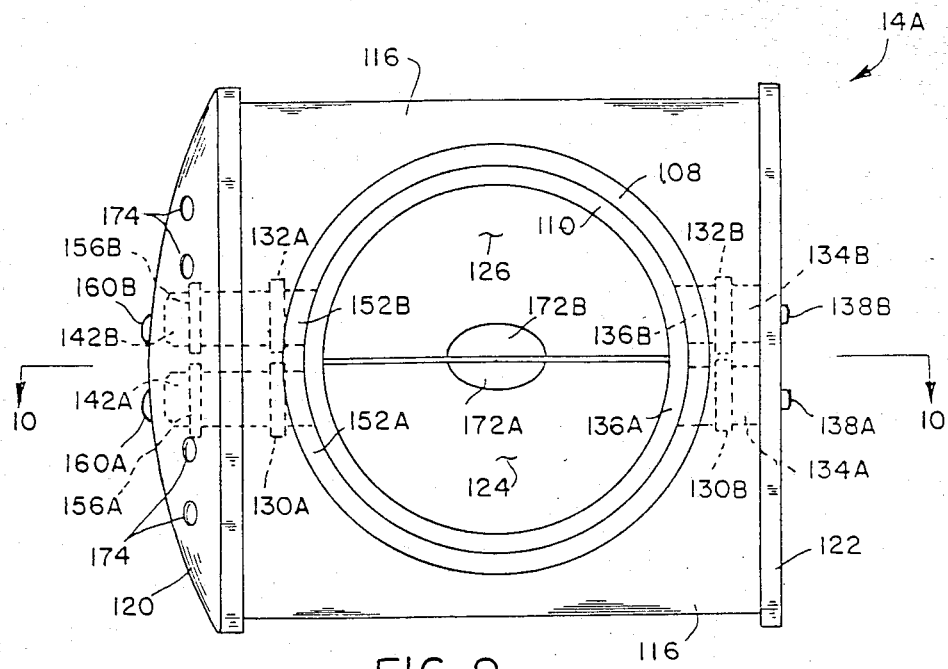
FIG. 9 is a frontal view of the airflow control valve of the invention as looking down the input thereof.
Figure 10:
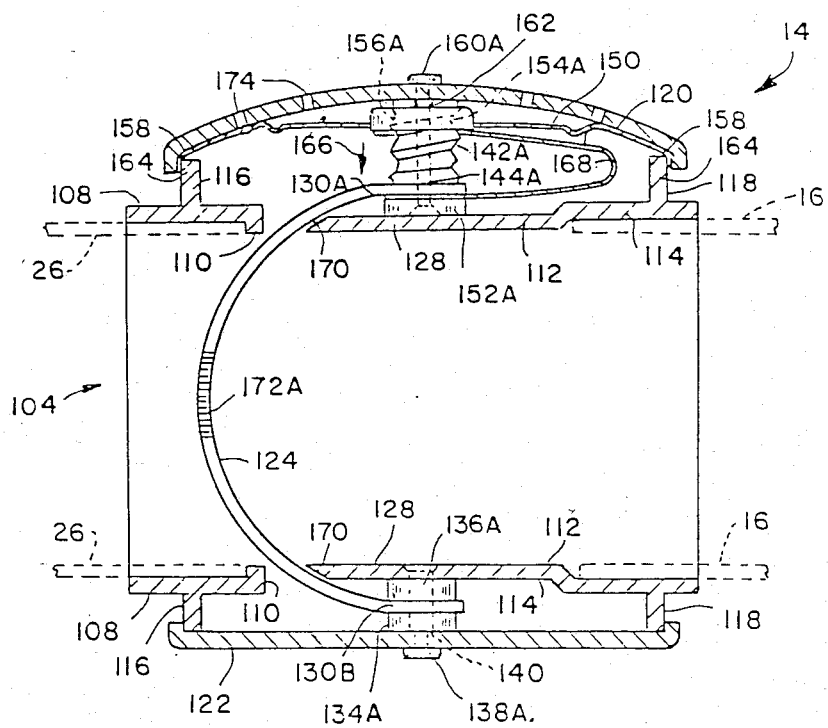
FIG. 10 is a cross-sectional view of FIG. 9 along lines 10—10.
Figure 11:
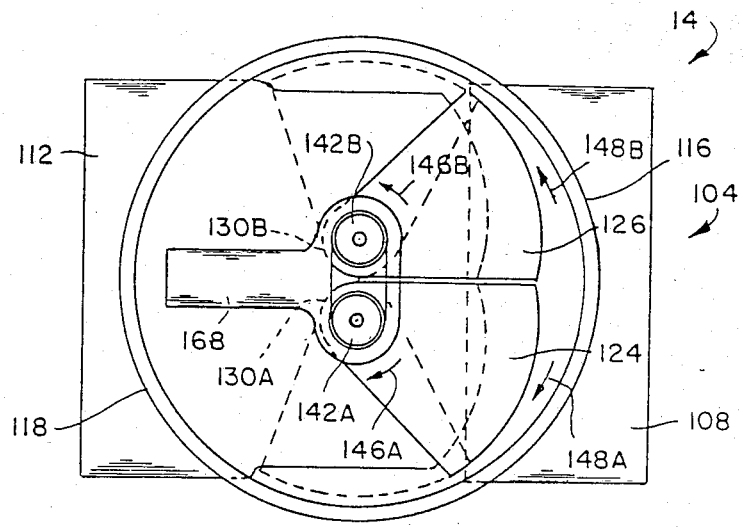
FIG. 11 is a side view of the airflow control valve of FIGS. 9 and 10 with the cover and the diaphragm having been removed.

FIGS. 9, 10, and 11 illustrate the airflow control valve 14 of the invention. More particularly, FIG. 9 is a frontal view of the airflow control valve 14 looking down the input 104 thereof; FIG. 10 is a cross-sectional view of FIG. 9 along lines 10—10; and FIG. 11 is a side view of the airflow control valve 14 with the cover 120 and diaphragm 150 having been removed.

Basically, the airflow control valve 14 comprises an input conduit 108 having an inwardly disposed lip 110 for receiving the output 30 of the input conduit 26 of the picker head 12. The airflow control valve 14 further comprises an output conduit 112 positioned in axial alignment with the input conduit 108. The output conduit 112 includes an annular recess 114 for receiving the input of the rigid conduit 16 such that the inner surface of the rigid conduit 16 will be flush with the inner surface of the output conduit 112. The input conduit 108 and the output conduit 112 are positioned in axial alignment with one another by means of a pair of annular flanges 116 and 118 which are integrally molded and positioned on opposed sides of the input conduit 108 and the output conduit 112. The two flanges 116 and 118 are arcuately shaped and are joined together to form a substantially cylindrical configuration. A substantially dome-shaped cover 120 is then positioned over the first annular flange 116, and a substantially flat cover 122 is positioned over the second annular flange 118.

The airflow control valve 14 further comprises a pair of gates 124 and 126 which are pivotably connected to the proximal end 128 of the output conduit 112. More particularly, each of the gates 124 and 126 comprise a configuration substantially identical to a segment of a sphere. The ends 130A and 130B of the first gate 124 and the ends 132A and 132B of the second gate 126 are pivotably connected to opposing sides of the proximal end 128 of the output conduit 112.

The gates 124 and 126 function to open and close the input of the output conduit 112. Specifically, the ends 130B and 132B of the gates 124 and 126 are respectively rigidly connected to spacers 134A and 134B. The spacers 134A and 134B are rotatably disposed between the cover 122 and a pair of bosses 136A and 136B integrally molded to the proximal end 128 of the output conduit 112. Fasteners such as rivets 138A and 138B are positioned through apertures in the bosses 136A and 136B, spacers 134A and 134B, and cover 122 to secure the cover 122 to the output conduit 112. The rivets 138A and 138B each includes a shoulder 140 which rests against the inside surface of the cover 122 to prevent the spacers 134A and 134B from binding between the bosses 136A and 136B and the cover 122. In a similar manner, the other ends 130A and 132A of the gates 124 and 126 are rigidly connected to another pair of spacers 142A and 142B which are rotatably disposed between the cover 120 and another pair of bosses 152A and 152B integrally molded to the proximal end 128 of the output conduit 112. Fasteners such as rivets 160A and 160B engage through apertures in the bosses 152A and 152B, spacers 142A and 142B, and cover 120 to secure the cover 120 to the output conduit 112. The rivets 160A and 160B each include a shoulder 162 which rests against the inner surface of cover 120 to prevent the spacers 142A and 142B from binding between the bosses 152A and 152B and the cover 120. It should be appreciated that with the ends 130A and 132A of the gates 124 and 126 being rigidly connected to spacers 142A and 142B, rotation of the spacers 142A and 142B in the direction as shown by arrows 146A and 146B causes the gates 124 and 126 to pivot in the direction shown by arrows 148A and 148B thereby opening the proximal end 128 of the output conduit 112.

A diaphragm 150 is positioned between the cover 120 and the output conduit 112 for rotating the spacers 142A and 142B when a pressure differential exists between the atmospheric air pressure and the pressure within the input conduit 108. More particularly, diaphragm 150 comprises a pair of collars 156A and 156B having internal helical threads 154A and 154B. Corresponding helical threads 144A and 144B are disposed exterially along the length of each of the spacers 142A and 142B, with the direction of the helical thread 144A being opposite to that of the helical thread 144B. The peripheral edge 158 of the diaphragm 150 is sealingly positioned between the terminal end 164 of the annular flanges, 116 and 118 and the cover 120 enabling the diaphragm 150 to flex inwardly in response to a pressure differential between the atmospheric air pressure and the pressure within the input conduit 108. Movement of the diaphragm 150 and the collar 156A and 156B inwardly as shown by arrow 166, causes the spacers 142A and 142B to rotate in the direction as shown by arrows 146A and 146B thereby opening the gates 124 and 126 in the direction as shown by arrows 148A and 148B. A return spring 168 is positioned between the collars 156A and 156B and the inner sides of the ends 130A and 132A of the gates 124 and 126 to urge the bosses 156A and 156B and, correspondingly, diaphragm 150 to return to a position adjacent to the inside of cover 120 thereby closing gates 124 and 126.

The airflow control valve 14 operates in the following manner. The gates 124 and 126 remain in their normally closed position by virtue of spring 168. When a vacuum source is connected relative to the output of the output conduit 112, a certain amount of the air contained within the picker head 12 will bleed through the junction between the gates 124 and 126, and through the seal formed between the edges 170 of the proximal end 128 of the output conduit 112 and the gates 124 and 126. The amount of bleed-through air is important for proper operation of the airflow control valve 14, and may be increased by the incorporation of bleed ports 172A and 172B through the gates 124 and 126. (See FIG. 9). Specifically, when a fruit 46 is positioned within the picker head 12, atmospheric air will be prevented from flowing into the interior of the picker head 12. The air contained within the picker head 12 is then at least partially evacuated by the vacuum source by the air bleeding through the bleed ports 172. The pressure of the atmospheric air flowing through apertures 174 in the cover 120 against the outside surface of the diaphragm 150 is then sufficient to overcome the pressure exerted on the diaphragm 150 by the spring 168 thereby causing the diaphragm 150 to move inwardly in the direction shown by arrow 166. During such movement of the diaphragm 150, the gates 124 and 126 are pivoted to their open position enabling the fruit 46 to pass therethrough and be discharged through the output conduit 112. Once the fruit 46 passes beyond the gates 124 and 126, atmospheric air will again fill the interior of the picker head 12 and therefore equalize the air pressure exerted on both sides of the diaphragm 150. Spring 168 is then able to force the diaphragm 20 return to its position adjacent to the inside of cover 20 thereby closing gates 124 and 126.

Experiments with prototypes of the airflow control valve 14 built according to this invention have indicated that the speed in which the gates 124 and 126 open is related to the size of the bleed ports 172 and the force of the spring 168 acting against the diaphragm 150. Accordingly, increasing the size of the bleed ports 172 or reducing the interior volume of the picker head 12 will enable the interior of the picker head 12 to be evacuated more quickly, thereby enabling the atmospheric air pressure exerted against diaphragm 150 to more quickly overcome the tension in the spring 168 and open the gates 124 and 126. An opening time of approximately 250 milliseconds has been achieved when the picker head 12 and the airflow control valve 14 are built in the same proportion as shown in the drawings. It should be understood, however, that such proportional dimensions may be changed to increase or decrease the opening time of the gates 124 and 126.

Discharge Valve

Figure 12:
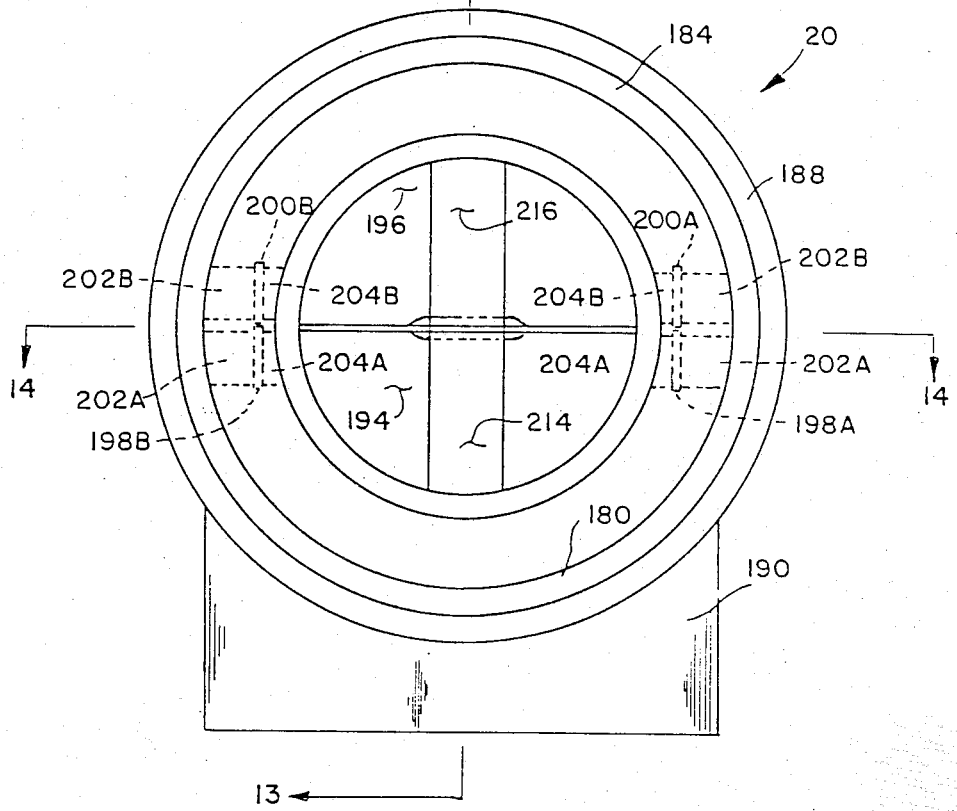
FIG. 12 is a frontal view of the discharge valve of the invention as looking down the input thereof.
Figure 13:
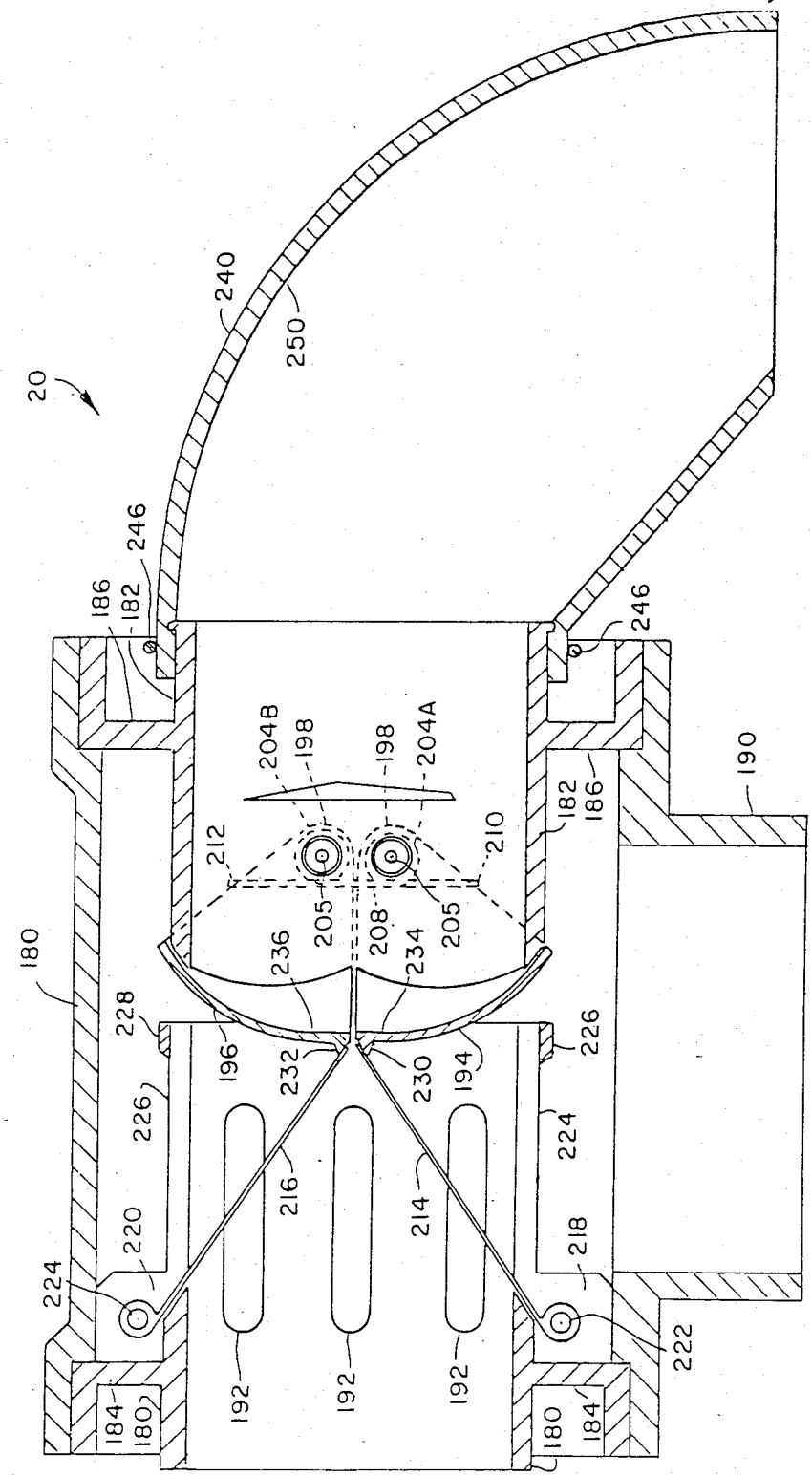
FIG. 13 is a cross-sectional view of FIG. 12 along lines 13—13.
Figure 14:
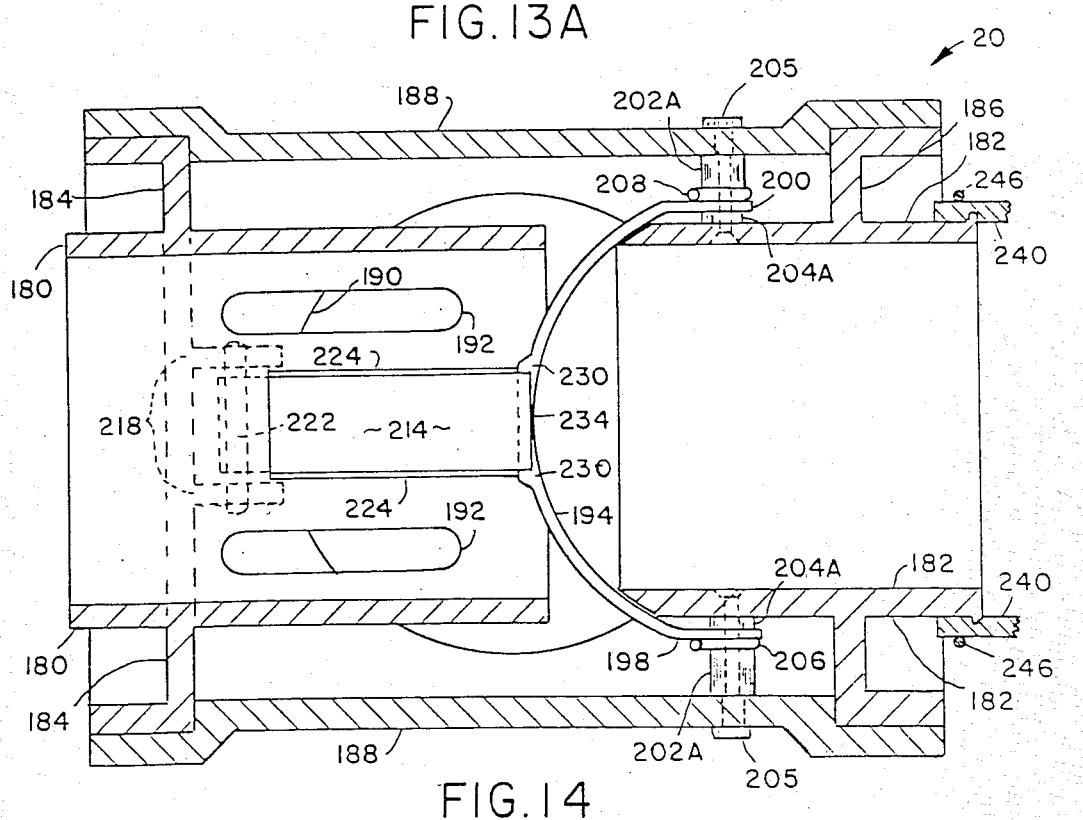
FIG. 14 is a cross-sectional view of FIG. 12 along lines 14—14.

FIGS. 12, 13, and 14 illustrate the discharge valve 20 of the invention which enables the harvested fruit 46 to be discharged from the flexible conduit 18 into a storage area while minimizing the amount of flow back air which enters the output of the discharge valve 20 when the fruit 46 is discharged.

The discharge valve 20 of the invention comprises an input conduit 180 and an output conduit 182. An annular flange 184 is secured around the circumference of the input conduit 180. Another annular flange 186 is similarly connected about the circumference of the output conduit 182. A substantially cylindrical manifold conduit 188 is then postioned concentrically about the input conduit 180 and the output conduit 182 and connected to the flanges 184 and 186 thereof. One end of a vacuum supply conduit 190 is connected through the wall of the cylindrical conduit 188, with the other end of the vacuum supply conduit 190 being dimensioned for connection to the vacuum source of the fruit harvesting machine 10. A plurality of vacuum vents 192 are positioned circumventially about the input conduit 180 such that the air contained within the input conduit 180 is evacuated by flowing through the vacuum vents 192 to the vacuum source.

A pair of gates 194 and 196 are connected to the input of the output conduit 182. The gates 194 and 196 comprises a configuration substantially identical to a segment of a sphere. The ends 198A and 198B and 200A and 200B of the gates 194 and 196, respectively, are pivotably connected to opposing sides of the output conduit 182. More particularly, two pair of bosses 202A and 202B extend from opposing sides of the cylindrical conduit 188 in axial alignment with another pair of bosses 204A and 204B integrally formed to extend from the outside surface of the output conduit 182. The bosses 202 and 204 are respectively connected together by a fastener such as a rivet 205. The ends 198 and 200 of the gates 194 and 196 each include an aperture enabling the ends 198 and 200 to be pivotably connected about the respective bosses 204. As thus pivotably connected, the gates 194 and 196 are able to pivot to an opened position between the cylindrical conduit 180 and the output conduit 182. A pair of springs 206 and 208 are respectively wrapped about each pair of bosses 202A and 202B. The terminal ends 210 and 212 of each spring 206 and 208 are then bent around the outer edge of the gates 194 and 196 to urge the gates 194 and 196 toward one another to a closed position.

A pair of gate operating levers 214 and 216 are pivotably connected to opposed sides of the input conduit 180 at respective U-shaped members 218 and 220 which extend from opposing sides of the input conduit 180. The proximal end of each of the levers 214 and 216 extends into their respective U-shaped member 218 and 220 and are respectively connected thereto by means of hinge pins 222 and 224. The levers 214 and 216 each include a length sufficient to extend to the junction of the gates 194 and 196. As a fruit 46 is conducted through conduits 16 and 18 and enters the input conduit 180, the fruit 46 will press against both of the levers 216 causing the levers 214 and 216 to pivot into respective slots 224 and 226 incorporated within opposing sides of the input conduit 180. A pair of stops 226 and 228 are formed at opposing sides of the terminal end of the input conduit 180 to limit the travel of the levers 214 and 216. As the levers 214 and 216 are pivoted toward their slots 224 and 226, the levers 214 and 216 will force the gates 194 and 196 to pivot to their open position. A protuberance 230 and 232 may be integrally formed along the edge 234 and 236 of each of the gates 194 and 196, respectively, to prevent the levers 214 and 216 from slipping off of the edge 234 and 236 of the gates 194 and 196 as the gates 194 and 196 are pivoted to their open position. After the fruit 46 passes beyond the levers 214 and 216, springs 206 and 208 force the gates 194 and 196 to return to their closed position. When closed, the gates 194 and 196 prevent flow back air from entering the output of the output conduit 182 and flowing to the vacuum source of the first harvesting machine.

Figure 13A:
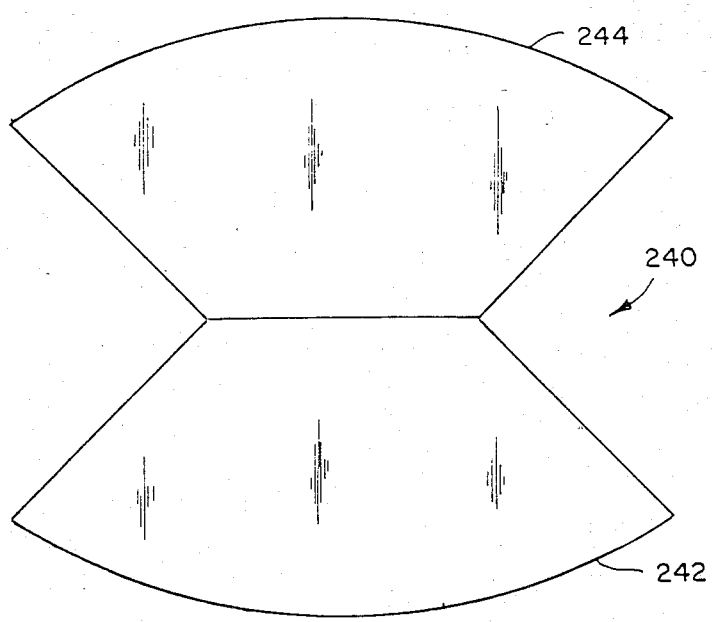
FIG. 13A is a plan view of the piece of material from which the catcher of the discharge valve is manufactured.

A catcher 240 is connected to the output of the output conduit 182 to reduce the velocity of the exiting fruit 46 and to change the direction of the fruit 46 such that the fruit 46 will be discharged in a direction perpendicular to the axis of the output conduit 182. The design of the catcher 240 is best illustrated in FIG. 13A as being manufactured from a single piece of resilient material having a butterfly configuration. The configuration of the catcher 240 is formed by sewing the outside curved edges 242 and 244 together thereby producing a curved conduit. The input of the catcher 240 is then connected to the output of the output conduit 182 by means of a retaining band 246 or the like. It should be appreciated that the catcher 240 thus formed has a seam located at the uppermost portion of the conduit along the entire length thereof. The seam therefore forms a vee 250 at the backside of the catcher 240. Accordingly, as the fruit 46 is discharged from the output conduit 182, the fruit will strike the vee 250 at which time the velocity of the fruit 46 will be greatly reduced and the direction of the fruit 46 will be changed such that the fruit 46 will be discharged in a direction perpendicular to the axis of the output conduit 182. It should be appreciated, however, that the vee 250 cushions the fruit 46 as the velocity of the fruit 46 is reduced, thereby preventing the fruit 46 from being bruised or damaged.

Mobile Transport

Figure 15:
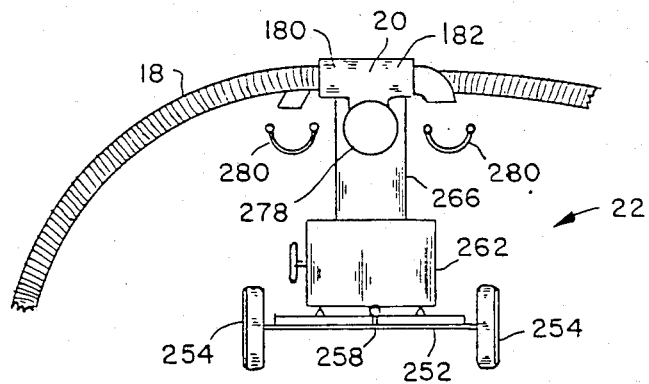
FIG. 15 is a rear view of the transport of the invention.
Figure 16:
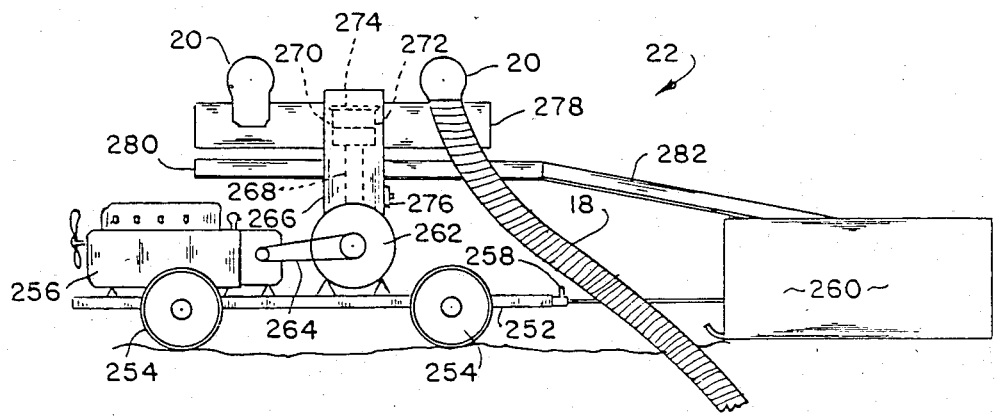
FIG. 16 is a side view of the transport shown in FIG. 15.

As shown in FIGS. 1, 15, and 16, the mobile transport 22 of the invention comprises a frame 252 having four wheels 254 connected thereto. An engine 256 is secured to the frame 252 and is connected by a suitable transmission to drive the wheels 254. A hitch 258 is provided for pulling a storage bin 260 behind the transport 22.

A vacuum source 262 is connected to the frame 252 and is powered by the engine 256 by a pulley and belt assembly 264. Preferably, the vacuum source 262 comprises a positive displacement type vacuum pump. A housing 266 is connected above the vacuum source 262. The input conduit 268 of the vacuum source 262 extends into the housing 266. Suitable filter means 270 is connected to the input of the input conduit 268. Preferably, the filter means 270 comprises two or more automotive air filters 272 connected to the input of the input conduit 268 by means of a plate and threaded stock combination 274. A trash door 276 is positioned through the bottom of the housing 266 to provide access to the interior of the housing 266 for cleaning. A manifold 278 is connected in fluid communication with the housing 266. The manifold 278 may extend parallel to the longitudinal axis of the transport 22, as shown in FIGS. 15 and 16. Alternatively, the manifold 278 may extend transverse to the longitudinal axis of the transport 22. A plurality of discharge valves 20 are then connected in fluid communication with the manifold 278. Preferably, the input and output conduits 180 and 182 of the discharge valves 20 extend perpendicular to the manifold 278. This enables the flexible conduits 18 to extend outwardly from the sides of the transport 22 as the transport 22 travels between rows of fruit trees. More importantly, however, the discharge valves 20 are preferably disposed perpendicular to the manifold 278 to enable the catchers 240 to be positioned immediately above a pair of troughs 280 which extend parallel to opposing sides of the manifold 278. Each trough 280 is preferably made of a resilient material such as flexible nylon material or canvas such that the fruit 46 will be cushioned as it exits the catcher 240. The troughs 280 are sloped rearwardly enabling the harvested fruit 46 to roll into another trough 282 which leads to the storage bin 260.

It should be appreciated that, as the transport 22 travels between rows of fruit trees, the workers are able to conveniently harvest the fruit from the trees. The harvested fruit then automatically flows into the storage bin 260. When the storage bin 260 is filled with fruit, the storage bin 260 is hauled away by a forklift and an empty one is reconnected to the transport 22. It should be understood, however, that a plurality of storage bins 260 may be placed at regular intervals along the row of fruit trees, with trough 282 being pivotably connected to the juncture of troughs 280 such that the harvested fruit flows into the individual storage bins 260.

The present disclosure includes that contained in the appended claims as well as that of the foregoing description. Although this invention has been described in its preferred form with a cerain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A transport for a fruit harvesting machine, comprising in combination:
   a frame;
   means for connecting the vacuum source of the fruit harvesting machine to said frame;
   a housing connected to the vacuum source;
   an input conduit of the said vacuum source extending into said housing;
   filter means connected about said input conduit for filtering fluid passing towards said vacuum source;
   a manifold connected to said housing; and
   means for connecting at least one of the discharge valves of the fruit harvesting machine to said manifold such that said discharge valve is connected in fluid communication with the vacuum source.

2. The transport as set forth in claim 1, wherein the discharge valves are positioned perpendicular to said manifold.

3. The transport as set forth in claim 1, further including a trough connected parallel to said manifold for receiving fruit discharged from the discharge valve of the fruit harvesting machine.

4. A transport for a fruit harvesting machine, comprising in combination:
   a frame;
   a vacuum source of the fruit harvesting machine being connected to said frame;
   a housing connected to said vacuum source;
   an input conduit of said vacuum source extending from said vacuum source into the interior of said housing;
   a filter encircling the input conduit such that the flow path of fluid flowing towards said vacuum source passes through said filter;
   a manifold connected to said housing such that the fluid flow path passes through said manifold toward said filter;
   coupling means for connecting a discharge valve of the fruit harvesting machine to said manifold such that said discharge valve is connected in fluid communication with said vacuum source; and
   a catcher disposed on the opposite side of said manifold from said discharge valve relative to said filter for receiving fruit discharged through said discharge valve, said fruit flowing from said discharge valve through said manifold in a direction towards said catcher and substantially perpendicular to the direction of flow of said fluid to said vacuum source.

5. A transport for a fruit harvesting machine as set forth in claim 4 further including:
   a trough disposed substantially perpendicularly relative to the direction of travel of said fruit from said discharge valve towards said catcher for guiding the fruit from said catcher;
   a bin means for receiving the fruit guided by said trough from said catcher towards bin means.

* * * * *

UNITED STATES PATENT AND TRADEMARK OFFICE
CERTIFICATE OF CORRECTION

PATENT NO. : 4,501,113
DATED : February 26, 1985
INVENTOR(S) : Curtis E. Gerber

It is certified that error appears in the above-identified patent and that said Letters Patent are hereby corrected as shown below:

Column 3, line 52, delete "posiion" and insert therefore --position--.

Signed and Sealed this

Thirteenth Day of August 1985

[SEAL]

Attest:

DONALD J. QUIGG

*Attesting Officer*　　　*Acting Commissioner of Patents and Trademarks*